United States Patent [19]

Jung

[11] Patent Number: 5,732,159
[45] Date of Patent: Mar. 24, 1998

[54] BLOCKING-EFFECT ELIMINATING CIRCUIT FOR USE IN IMAGE SIGNAL CODER/DECODER

[75] Inventor: Seok-yoon Jung, Seoul, Rep. of Korea

[73] Assignee: Samsung Electronics Co., Ltd., Suwon, Rep. of Korea

[21] Appl. No.: 637,412

[22] Filed: Apr. 24, 1996

[30] Foreign Application Priority Data

Apr. 29, 1995 [KR] Rep. of Korea ............... 95-10546

[51] Int. Cl.$^6$ ............... G06T 5/00; G06T 9/00; H04N 1/409; H04N 1/415
[52] U.S. Cl. ............... 382/262; 382/264; 382/268; 382/250; 382/275; 358/433; 358/463
[58] Field of Search ............... 382/262, 268, 382/263, 260, 254, 275, 250, 239; 358/433, 432, 463; 348/420, 403, 404

[56] References Cited

U.S. PATENT DOCUMENTS 5,359,676  10/1994  Fan ............... 382/260
5,379,122  1/1995  Eschbach ............... 358/433

OTHER PUBLICATIONS

A. Zakhor, "Iterative Procedures for Reduction of Blocking Effects in Transform Image Coding," *IEEE Transactions on Circuits and Systems For Video Technology*, vol. 2, No. 1, Mar. 1992, pp. 91–95.

Y. Nakajima, "Postprocessing Algorithms for Noise Reduction of MPEG Coded Video," The Institute of Electronics Information and Communications Engineers, *Technical Report*, IE94-7, pp. 45–51.

*Primary Examiner*—Scott A. Rogers
*Attorney, Agent, or Firm*—Burns, Doane, Swecker & Mathis, L.L.P.

[57] ABSTRACT

A blocking-effect eliminating circuit in an image coder/decoder employs a weighted value according to the location of each pixel and the quantization step size in a block constituting an input image, to thereby reduce the blocking effect generated in a received image and enhance image quality.

3 Claims, 4 Drawing Sheets

BLOCKING-EFFECT ELIMINATING CIRCUIT FOR USE IN IMAGE SIGNAL CODER/DECODER

BACKGROUND OF THE INVENTION

The present invention relates to an image signal coder and decoder, and more particularly, to a blocking-effect eliminating circuit for reducing a blocking effect by filtering an input image employing weighted values which differ depending on the positions of each pixel of a block constituting the input image and a quantization step size.

Most of image coding systems, for example, JPEG and MPEG, adopted as a standard system for coding a still image and a motion image employ a discrete cosine transform (DCT) and a block unit process. Such image coding systems are such that an input image is divided into a block of predetermined size N×N pixels, with each block undergoing a DCT operation and hence an image signal is coded. In this procedure, the generated transform coefficient is quantized thereby causing data loss. Therefore, the data inverse-transformed with respect to the transform coefficient differs from the original data, thereby causing a discontinuity in an adjacent block. That is, in a coding system for a block unit, a discontinuity with an adjacent block is generated at the edge of each block of a received image. This is called a "blocking effect" which becomes more serious when transmission rate is low.

To reduce such a blocking effect, a low-pass filter is used. The low-pass filter registers that a signal suddenly changes at the boundary of an adjacent block as a discontinuity between blocks occurs and the spatial frequency rises sharply at the boundary. Such a method is simply achieved but may cause blurring of the image itself.

SUMMARY OF THE INVENTION

Accordingly, it is an object of the present invention to provide a blocking-effect eliminating circuit for reducing a blocking effect by filtering an input image employing weighted values which differ depending on the position of each pixel of a block constituting the input image, and a quantization step size in an image signal coder/decoder.

To accomplish the above object, there is provided a blocking-effect eliminating circuit in an image signal coder and decoder that processes by block units comprising:

first filtering means for separating a coded image signal into a low frequency signal and a high frequency signal;

second filtering means for performing a median filtering for the high frequency signal output from the first filtering means so as to eliminate any portion exhibiting sudden changes;

a control logic for determining weighted values by employing pixel position information in a block constituting the coded image signal and a quantization step size used for coding;

a variable amplifier for amplifying a median-filtered high frequency signal output from the second filtering means using the weighted values determined by the control logic, and adding the amplified high frequency signals to the high frequency signal output from the first filtering means; and an adder for adding the low frequency signal output from the first filtering means to a signal output from the variable amplifier.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
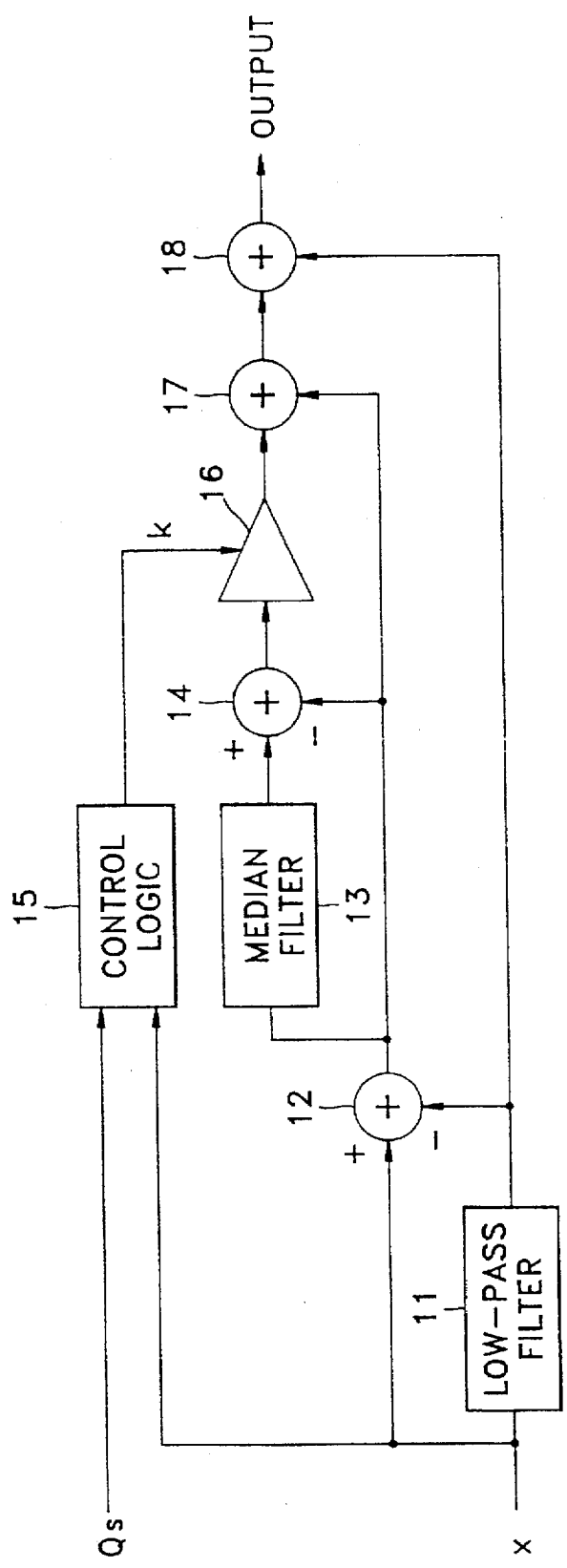
FIG. 1 is a block diagram showing a blocking-effect eliminating circuit in an image signal coder/decoder according to the present invention.

FIG. 1 is a block diagram showing a blocking-effect eliminating circuit in an image signal coder/decoder according to the present invention. The blocking-effect eliminating circuit comprises a low-pass filter 11, a first subtractor 12, a median filter 13, a second subtractor 14, a control logic 15, a variable amplifier 16, a first adder 17 and a second adder 18.

Figure 2:
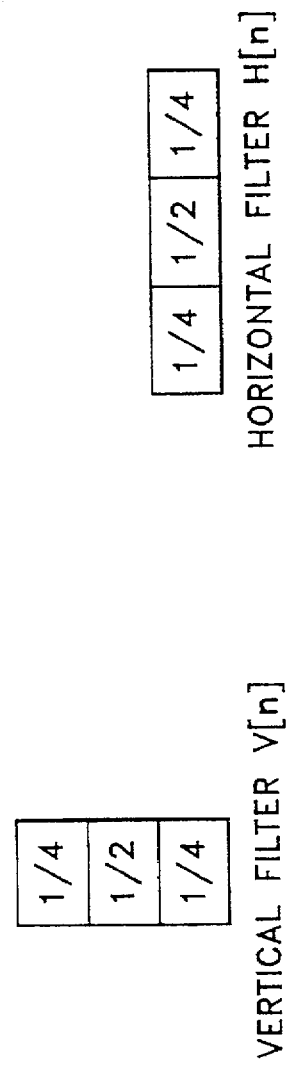
FIG. 2 shows an embodiment of the low pass filter shown in FIG. 1.
Figure 3A:
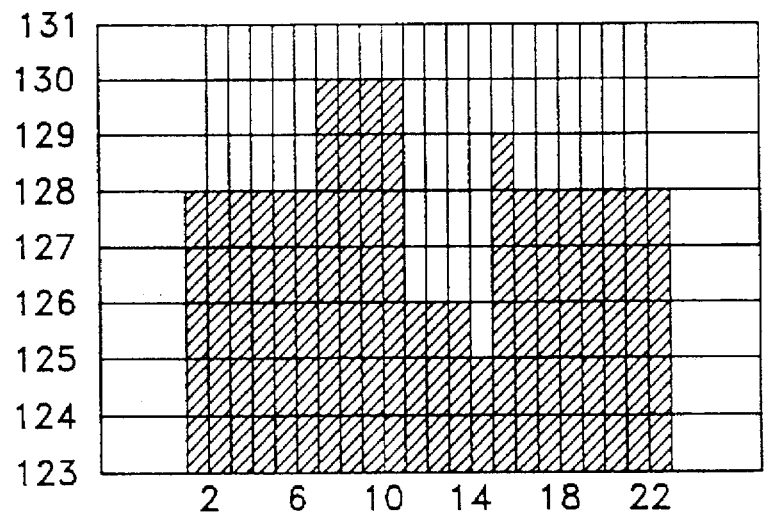
FIGS. 3A to 3I show digitized signal forms of each portion shown in FIG. 1.
Figure 3B:
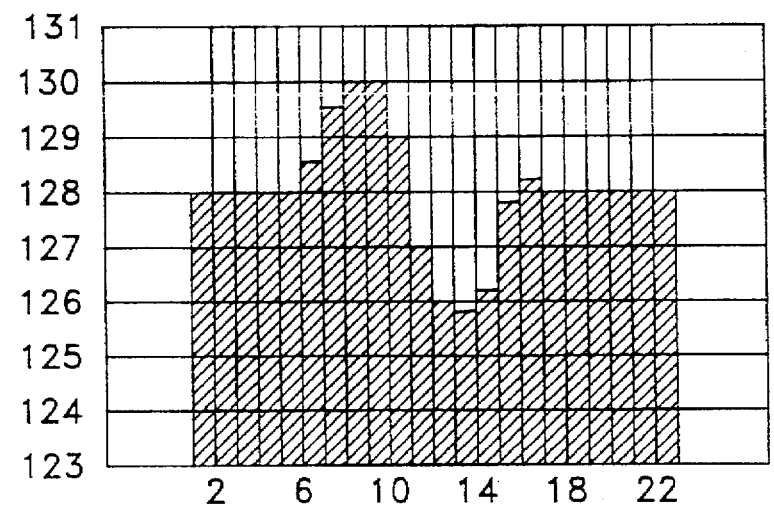
Figure 3C:
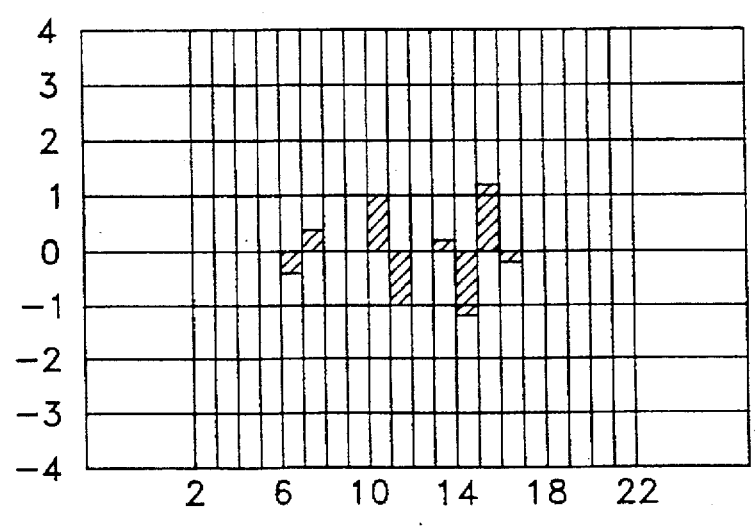
Figure 3D:
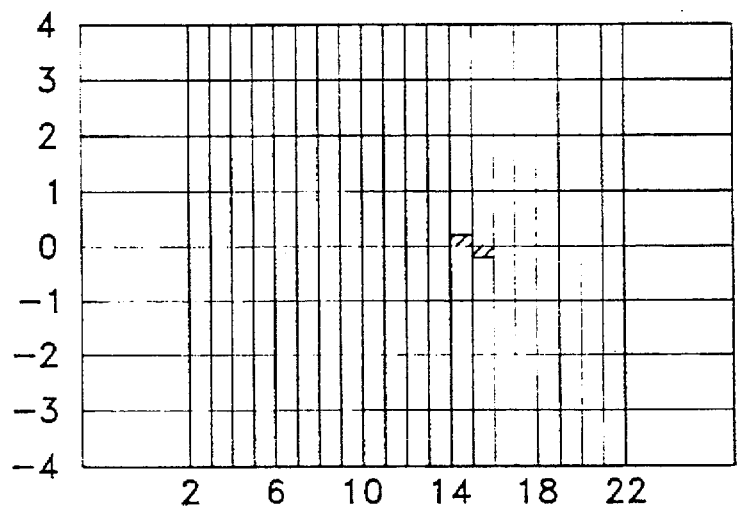
Figure 3E:
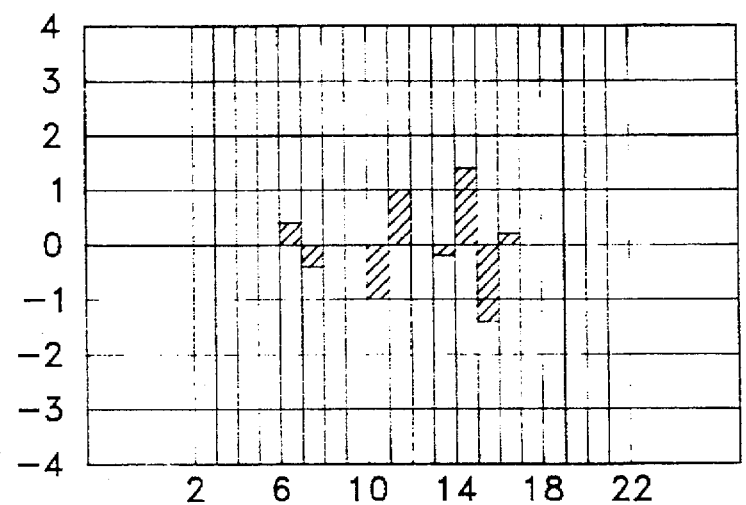
Figure 3F:
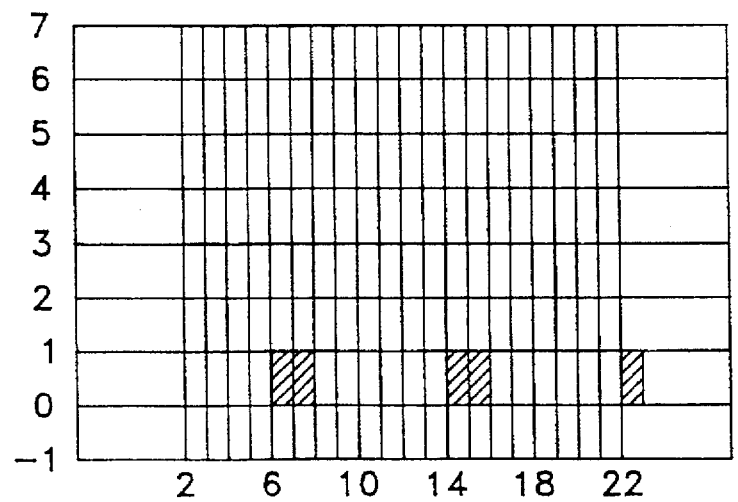
Figure 3G:
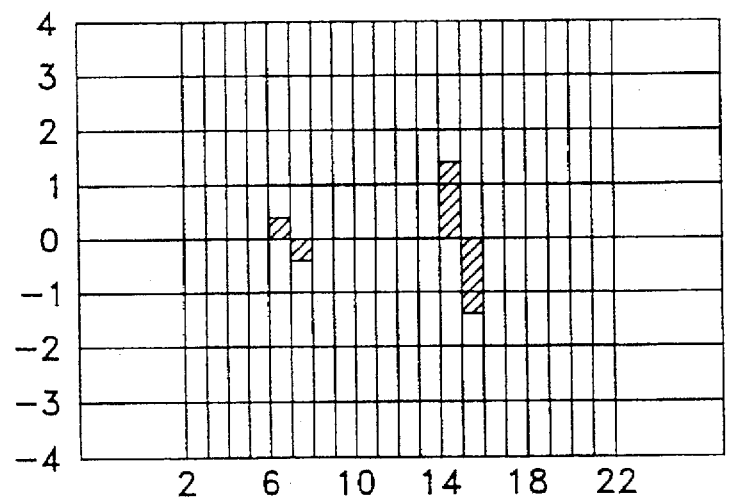
Figure 3H:
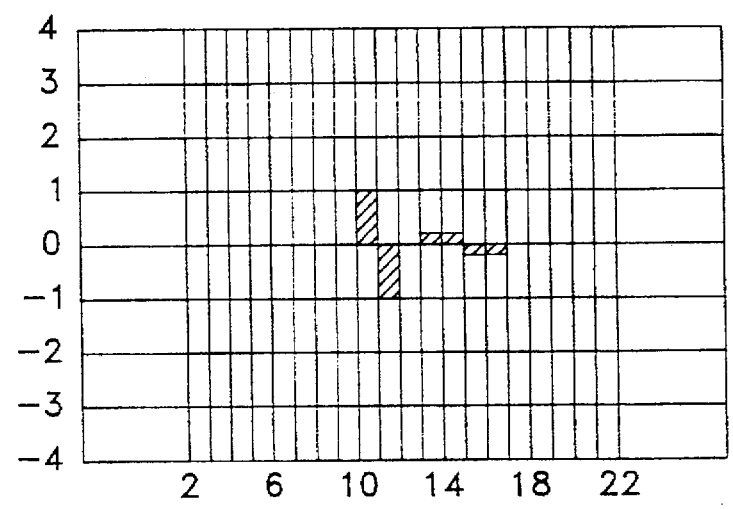
Figure 3I:
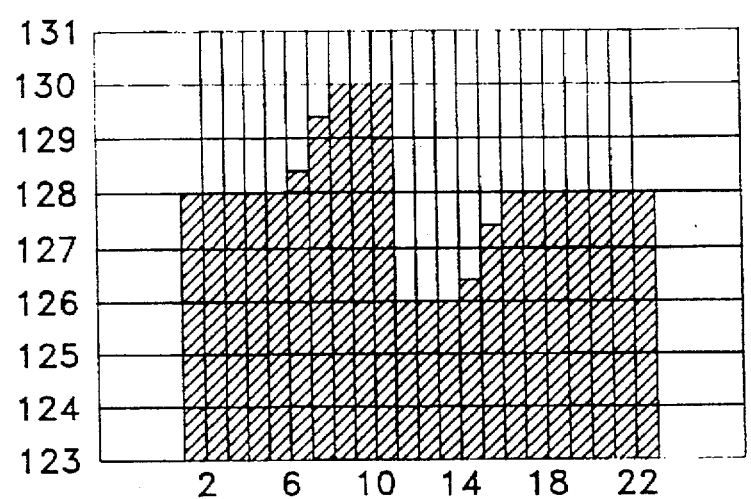

FIG. 2 shows an embodiment of the low pass filter 11 shown in FIG. 1. The low-pass filter is divided into a vertical filter (V[n]) and a horizontal filter (H[n]). FIGS. 3A to 3I show digitized signal forms of each portion shown in FIG. 1. FIG. 3A illustrates an input image (x), FIG. 3B illustrates the output of low-pass filter 11, FIG. 3C illustrates the high frequency component eliminated by low-pass filter 11, FIG. 3D illustrates the output of median filter 13, FIG. 3E illustrates the output of second subtractor 14, FIG. 3F illustrates weighted values for positions for each block, FIG. 3G illustrates the output of variable amplifier 16, FIG. 3H illustrates the output of first adder 17, and FIG. 3I illustrates the output of second subtractor 18.

Operation of a blocking-effect eliminating circuit of the present invention can be explained with reference to FIG. 1 to FIG. 3.

Referring to FIG. 1, low-pass filter 11 performs a low-pass-filtering operation to an input image (x) so as to eliminate the high frequency component. Here, the input image x(i,j) is interpreted in one dimension by using the example of the case where a block size is 8×8 pixels as shown in FIG. 3A and a discontinuity occurs between seventh and eighth pixels, and fifteenth and sixteenth pixels. That is, the change between eleventh and twelfth pixels has to be maintained while eliminating the discontinuities at the two aforementioned points since the change does not occur at a block boundary. If low-pass filter 11 is constituted as shown in FIG. 2, output xλ(i,j) of low-pass filter 11 can be expressed as the following expression (1).

$$x\lambda(i,j) = \sum_m \left[ H(m) \sum_n V(n)x(i-n, j-m) \right] \quad (1)$$

In the expression (1), xλ(i,j) is an output signal of low-pass filter 11, i is a vertical direction, and j is a horizontal direction. H(m) and V(n) are horizontal and vertical filters in the separated spatial filter as shown in FIG. 2. FIG. 3B illustrates a signal output as a result of applying the separated spatial filter of FIG. 2 to the input image of FIG. 3A. As shown in FIG. 3B, the signal changes occur at eleventh and twelfth pixels.

First subtractor 12 subtracts output image xλ(i,j) of low-pass filter 11 from input image x(i,j), to thereby output difference signal $x_h(i,j)$. Here, the signal $x_h(i,j)$, the difference between the low-pass-filtered signal and the original input signal x(i,j) is the high frequency signal and can be shown as FIG. 3C. That is, $x_h(i,j)$ includes the high frequency signal generating a blocking effect caused by a discontinuity between blocks of input image x(i,j). Therefore, the signal relevant to the blocking effect is eliminated from $X_h(i,j)$ in the subsequent step.

Median filter 13 is for eliminating impulse noise caused by random bit error when an image is recorded or reproduced in or from a recording medium or an image is transmitted via a channel. The median filtering method is better at preserving information at the boundary of an image than a low pass filtering method that eliminates noise but damages information at the boundary of the image. The median filtering method for eliminating impulse noise aligns the center of a window to a pixel to be filtered, arranges pixels in the window and determines the most centered value as the filtered value. Median filter 13 of the present invention operates as the following expression (2) with respect to output signal ($x_h(i,j)$) of first subtractor 12.

$$u(i,j)=\text{MEDIAN}[x_h(i,j-1), x_h(i,j), X_h(i,j+1)] X_{med}(i,j)=\text{MEDIAN}[u(i-1,j), u(i,j), u(i+1,j)] \quad (2)$$

In the expression (2), median filter 13 is embodied as a horizontal and vertical separation type, $X_{med}(i,j)$ is an output signal of median filter 13 and u(i,j) is an output signal of an intermediate step. The output signal of median filter 13 is shown in FIG. 3D.

If the output signal of median filter 13 is added to the output signal of low pass filter 11, a signal which the portion exhibiting rapid change is eliminated from the input image can be obtained. In addition, adding the output signal of first subtractor 12 to the output signal of low-pass filter 11 results in the original input image x(i,j). Therefore, the original input image x(i,j) with a blocking effect is output. Accordingly, in the present invention where a weighted value (k) is employed in the above two cases, the following expression (3) can be obtained.

$$x_{proc}(i,j)=kx_{med}(i,j)+(1-k)x_h(i,j) \quad (3)$$

where 0>k>1.

In the expression (3), the original input image is output if k is zero. And a signal which all rapid changes are eliminated from the input image is output if k is one. In this time, a discontinuity between the eleventh and twelfth pixels is eliminated as shown in FIG. 3A, which means that the signal at the non-boundary between blocks is eliminated. Therefore, the k value is controlled so that signal loss does not occur at the non-boundary between blocks despite the presence of a discontinuity. For this purpose, second adder 14, control logic 15, variable amplifier 16 and first adder 17 operate as follows.

Second subtractor 14 subtracts the high frequency signal ($x_h(i,j)$) of FIG. 3C) output from first subtractor 12 from the output ($x_{med}(i,j)$ of FIG. 3D) Of median filter 13 and outputs the resulting signal ($x_{dif}(i,j)$ of FIG. 3E) to variable amplifier 16, as shown in the following expression $$x_{dif}(i,j)=x_{med}(i,j)-x_h(i,j) \quad (4)$$

Control logic 15 is for controlling weighted value (k) to an amplification degree according to the position of the pixel constituting an input image x(i,j) and quantization step size (Qs). As shown in FIG. 3F, weighted value (k) is put as 1 at a boundary pixel between blocks of the input image x(i,j), and as zero in a partial pixel other than a boundary pixel. In addition, weighted value (k) with respect to a block position is controlled by the quantization step size. The weighted value (k) is fixed at one when the quantization step size is at maximum, and the weight value (k) decreases as the quantization step size becomes smaller. Since large distortion occurs due to quantization, if the quantization step size is large, a discontinuity between blocks can easily be caused, which requires a great degree of high frequency elimination. The distortion decreases as the quantization step size becomes smaller and is regarded as a portion exhibiting rapid change in the original input image x(i,j) rather than a discontinuity caused by quantization even at a block boundary. Meanwhile, examples of weighted values in each position in a block are shown in the table below.

| 1.0 | 1.0 | 1.0 | 1.0 | 1.0 | 1.0 | 1.0 | 1.0 |
|---|---|---|---|---|---|---|---|
| 1.0 | 0.0 | 0.0 | 0.0 | 0.0 | 0.0 | 0.0 | 1.0 |
| 1.0 | 0.0 | 0.0 | 0.0 | 0.0 | 0.0 | 0.0 | 1.0 |
| 1.0 | 0.0 | 0.0 | 0.0 | 0.0 | 0.0 | 0.0 | 1.0 |
| 1.0 | 0.0 | 0.0 | 0.0 | 0.0 | 0.0 | 0.0 | 1.0 |
| 1.0 | 0.0 | 0.0 | 0.0 | 0.0 | 0.0 | 0.0 | 1.0 |
| 1.0 | 0.0 | 0.0 | 0.0 | 0.0 | 0.0 | 0.0 | 1.0 |
| 1.0 | 1.0 | 1.0 | 1.0 | 1.0 | 1.0 | 1.0 | 1.0 |

Variable amplifier 16 amplifies the output signal $x_{dif}(i,j)$ of second subtractor 14 using weighted values (k) which are controlled and output from control logic 15, and outputs the resulting signal ($kx_{dif}(i,j)$ of FIG. 3G) to first adder 17.

First adder 17 adds the output signal $kx_{dif}(i,j)$ from variable amplifier 16 to the output signal $x_h(i,j)$ of first subtractor 12 and outputs the resulting signal ($x_{proc}(i,j)$ of FIG. 3H) to second adder 18, which can be expressed as following expression (5).

$$\begin{aligned} kx_{dif}(i,j)+x_{hh}(i,j) &= k(x_{med}(i,j)-x_h(i,j)+x_h(i,j)) \\ &= kx_{med}(i,j)+(1-k)x_h(i,j) \\ &= x_{proc}(i,j) \end{aligned} \quad (5)$$

Second adder 18 adds the output signal $x_{proc}(i,j)$ from first adder 17 to the output signal xλ(i,j) of low-pass filter 11 and obtains the final output signal y, that is, $x_{out}(i,j)$.

As described above, a blocking effect eliminating circuit in an image coder/decoder of the present invention employs weighted values that differ according to the position of each pixel in a block constituting an input image and the quantization step size. Thus, the blocking effect generated in a received image is reduced in an image coder/decoder that employs block unit processing and transform coding, to thereby enhance image quality.

What is claimed is:

1. A blocking-effect eliminating circuit in an image signal coder/decoder that processes block units, said blocking-effect eliminating circuit comprising:

first filtering means for separating a coded image signal into a low frequency signal and a high frequency signal;

second filtering means for performing median filtering of the high frequency signal output from said first filtering means so as to eliminate portion exhibiting sudden change;

a control logic for determining a weighted value by employing pixel position information in a block constituting said coded image signal and a quantization step size used for the coding;

a variable amplifier for amplifying a median-filtered high frequency signal output from the second filtering means using the weighted value determined by the control logic, and adding the amplified high frequency signals to the high frequency signal output from the first filtering means; and an adder for adding the low frequency signal output from said first filtering means to a signal output from said variable amplifier.

2. A blocking-effect eliminating circuit according to claim 1, wherein said control logic controls a weighted value for a boundary pixel between blocks of said coded image signal as one and for a partial pixel other than said boundary pixel as zero.

3. A blocking-effect eliminating circuit according to claim 1, wherein said control logic fixes a weighted value as one when said quantization step size is at maximum and lowers the weighted value as the quantization step size is reduced.

* * * * *